Aug. 28, 1951      B. SCHILLER      2,565,700

SUGAR PLUM TREE

Filed Jan. 6, 1950

INVENTOR
*Bernard Schiller*
BY
ATTORNEYS

Patented Aug. 28, 1951

2,565,700

UNITED STATES PATENT OFFICE 2,565,700

SUGARPLUM TREE

Bernard Schiller, New York, N. Y., assignor to Banner Plastics Corporation, a corporation of New York Application January 6, 1950, Serial No. 137,127

5 Claims. (Cl. 41—12)

This invention relates to sugar plum trees, and is more particularly concerned with such trees formed by the assemblage of a few inexpensive and relative simply manufactured parts.

Broadly, my invention contemplates a sugar plum tree comprising a molded plastic structure having a trunk portion and limb portions integral with and extending from the trunk portion. A molded plastic base portion is provided and is adapted to support the plastic tree-like structure. Each limb portion is formed with a pointed outer end whereby it is adapted to have impaled on it an ornamental and/or edible object, for example candied sugar plums or gum drops. Preferably, the tree is made out of a water white or crystal colored thermoplastic, such as polystyrene, though of course other materials might be used.

More particularly my invention contemplates a molded plastic structure as set forth above which comprises two individually molded parts. Each part is formed with a trunk portion and limb portions integrally connected thereto. The upper end of the trunk portion of one part and the lower end of the trunk portion of the other part are bifurcated so that the two parts may be connected together, by interlocking the bifurcated portions, to form the composite plastic structure. The base portion is preferably of plate-like form and has an integral and central upright receptacle of cylindrical form to receive the lower end of the trunk of the composite structure to thereby support it. It is contemplated that an extra supply of the objects to be impaled on the pointed ends of the limbs may be stored in the plate-like base.

For a more detailed description of one type of sugar plum tree, which falls within the scope of my invention, reference may be made to the accompanying drawings in which.

Figure 1:
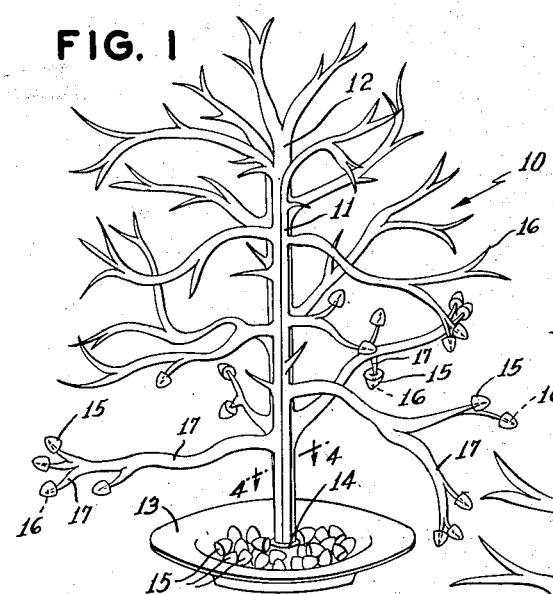
Fig. 1 is a perspective view of the plastic tree-like structure with ornamental and/or edible objects impaled on the ends of the limbs.

The sugar plum tree, according to this invention, comprises a composite tree-like structure indicated generally at 10 made up of two parts 11 and 12. A plate-like base 13 is provided to support the tree-like structure 10 and has an integral and central receptacle 14 of cylindrical form adapted to receive the lower end of the trunk of the composite tree-like structure 10. Gum drops 15 are shown impaled upon the pointed ends 16 of some of the branches 17 of the tree. An additional supply of gum drops 15 is shown as being contained in the plate-like base.

Figure 2:
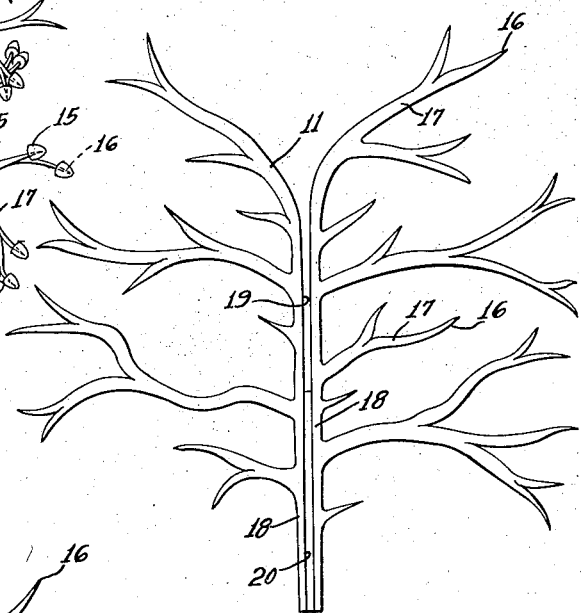
Figs. 2 and 3 are elevational views of the two bifurcated parts, which, when interlocked, form the tree-like structure.
Figure 3:
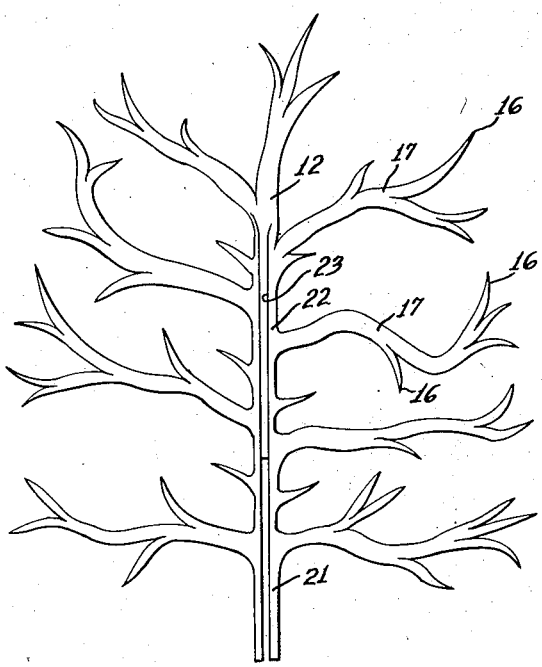
Figure 4:
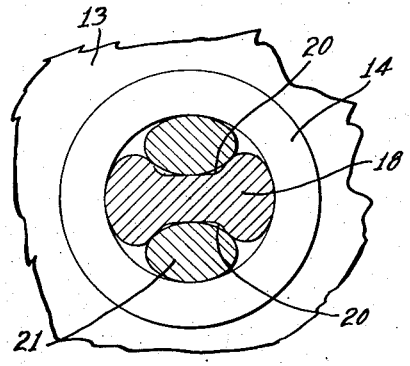
Fig. 4 is a sectional view taken along line 4—4 of Fig. 1.

Part 11 of the composite tree-like structure is shown in elevation in Fig. 2 having limbs 17 and a trunk portion 18. The upper end of the trunk portion is bifurcated at 19. Grooves 20, as seen most clearly in Fig. 4 are formed longitudinally in opposite sides of the lower end of trunk portion 18. These grooves are adapted to receive the bifurcated lower end 21 of trunk portion 22 of part 12, shown in elevation in Fig. 3. Part 12 is also provided with limb portions 17, as is part 11. Grooves 23 similar to grooves 20 of part 11 and for the same purpose, are formed in the upper end of trunk portion 22 of part 12.

As seen in Fig. 4, the trunk portions of parts 11 and 12 are generally in the form of two cylindrical portions connected together, where the trunk are not bifurcated, by a generally rectangular portion between grooves 20, in the case of part 11 and grooves 23 in the case of part 12. This construction gives the trunk portion of the composite structure as nearly a cylindrical form as is feasible.

In order to assemble the finished sugar plum tree, parts 11 and 12 are interconnected by positioning part 12 longitudinally opposite the upper end of part 11 with the limbs of part 12 extending in a direction generally at right angles to the direction in which the limbs of part 11 extend. The parts are then moved towards one another longitudinally, the lower arms of part 12 first passing along the bifurcated upper end of part 11 and then through grooves 20 therein. At the same time, of course, the arms of the bifurcated upper end of part 11 pass along the grooves 22 of the upper end of part 12. This longitudinal motion of the parts is continued until the lower ends of the two parts are substantially flush. As will be noted in Figs. 2 and 3, the lower ends of the parts are tapered inwardly so that the lower end of the composite trunk will properly fit into the receptacle 14 of base portion 13.

While the above-described sugar plum tree might be made out of any suitable material and might be made in any way, the material which it is preferred to use and the use of which is contemplated, is a water white or crystal thermoplastic, such as polystyrene, and the parts are preferably all molded. In the case of the parts 11 and 12, an injection molding process of any well-known type is preferably employed. When polystyrene is used, the resulting structure possesses a certain degree of resiliency and is not fragile or easily breakable. Additionally, because of the resiliency, the bifurcated ends of parts 11 and 12 will bend somewhat to permit ready assembly of them.

The resulting sugar plum tree has a number of desirable characteristics, among which are that it is inexpensive and easily made, that it is easily assembled, and that it presents an impression which is pleasing to the eye. The construction of the base portion provides a place for storing a readily available supply of candies, or whatever objects are to be impaled on the pointed ends of the limbs, from which replacement of candies that have been removed from the limbs for consumption may be made.

I claim:

1. An article of manufacture which consists essentially of a molded structure having the shape of a tree and formed in two parts, each part comprising a trunk portion and limb portions integrally connected thereto, the upper end of the trunk portion of one part and the lower end of the trunk portion of the other part being bifurcated whereby the two parts may be connected together to form the composite single structure in the shape of a tree, and a molded base of plate-like form having an integral and central upright receptacle to receive the lower end of the trunk of the composite structure and to thereby support the structure, each limb portion being formed with a pointed outer end whereby it is adapted to have impaled thereon an ornamental and edible object.

2. An article of manufacture which comprises a molded structure having the shape of a tree and formed in two parts, each part comprising a trunk portion and limb portions integrally connected thereto, the upper end of the trunk portion of one part and the lower end of the trunk portion of the other part being bifurcated whereby the two parts may be connected together to form the composite single structure in the shape of a tree, the unbifurcated portions of the trunk portions of both parts having grooves formed therein whereby when the parts are connected together the arms of the bifurcated portion of each part lie substantially in the grooves of the other part and the trunk of the composite structure appears to be one piece, and a molded base of plate-like form having an integral and central upright, substantially cylindrical receptacle to receive the lower end of the trunk of the composite structure and to thereby support the structure.

3. An article of manufacture which comprises a molded structure having the shape of a tree and formed in two parts, each part comprising a trunk portion and limb portions integrally connected thereto, the upper end of the trunk portion of one part and the lower end of the trunk portion of the other part being bifurcated whereby the two parts may be connected together to form the composite single structure in the shape of a tree, the unbifurcated portions of the trunk portions of both parts having grooves formed therein whereby when the parts are connected together the arms of the bifurcated portion of each part lie substantially in the grooves of the other part and the trunk of the composite structure appears to be one piece, the arms of the bifurcated portion of each part being substantially cylindrical in shape, and a molded base of plate-like form having an integral and central upright, substantially cylindrical receptacle to receive the lower end of the trunk of the composite structure and to thereby support the structure.

4. An article of manufacture which comprises a molded structure having the shape of a tree and formed in two parts, each part comprising a trunk portion and limb portions integrally connected thereto, the upper end of the trunk portion of one part and the lower end of the trunk portion of the other part being bifurcated whereby the two parts may be connected together to form the composite single structure in the shape of a tree, the unbifurcated portions of the trunk portions of both parts having grooves formed therein whereby when the parts are connected together the arms of the bifurcated portion of each part lie substantially in the grooves of the other part and the trunk of the composite structure appears to be one piece, the arms of the bifurcated portion of each part being substantially cylindrical in shape, and the unbifurcated portion of the trunk portion of each part comprising parallel substantially cylindrical portions joined together by a substantially rectangular portion, and a molded base of plate like form having an integral and central upright, substantially cylindrical receptacle to receive the lower end of the trunk of the composite structure and to thereby support the structure.

5. An article of manufacture which comprises a molded structure having the shape of a tree and formed in two parts, each part comprising a trunk portion and limb portions integrally connected thereto, the trunk portion of each part being substantially cylindrical in shape and having a pair of oppositely disposed longitudinal grooves formed in it, the upper end of the trunk portion of one part and the lower end of the trunk portion of the other part being bifurcated in the longitudinal planes of the grooves whereby the two parts may be connected together to form the composite single structure in the shape of a tree with the arms of the bifurcated portion of one part lying in the grooves of the other part so that the trunk portion of the composite structure appears as one piece, and a molded base of plate-like form having an integral and central upright, substantially cylindrical receptacle for receiving the lower end of the trunk of the composite structure, said receptacle having an inner cross-sectional area slightly smaller than the cross-sectional area of the composite trunk of the tree structure.

BERNARD SCHILLER.

REFERENCES CITED

The following references are of record in the file of this patent:

UNITED STATES PATENTS

| Number | Name | Date |
|---|---|---|
| 1,468,743 | Porter | Sept. 25, 1923 |
| 1,665,618 | Wilson | Apr. 10, 1928 |
| 1,881,423 | Favreau | Oct. 11, 1932 |
| 2,316,589 | Iwanowicz | Apr. 13, 1943 |